United States Patent
Haverdink et al.

(10) Patent No.: US 7,165,928 B2
(45) Date of Patent: Jan. 23, 2007

(54) SEED COTTON HANDLING SYSTEM

(75) Inventors: Virgil Dean Haverdink, Ankeny, IA (US); Jesse Dru Haecker, Ankeny, IA (US); Jason Daniel Wattonville, Maxwell, IA (US)

(73) Assignee: Deere & Company, Moline, IL (US)

( * ) Notice: Subject to any disclaimer, the term of this patent is extended or adjusted under 35 U.S.C. 154(b) by 239 days.

(21) Appl. No.: 10/803,703

(22) Filed: Mar. 18, 2004

(65) Prior Publication Data

US 2005/0207877 A1 Sep. 22, 2005

(51) Int. Cl.
*B65B 37/00* (2006.01)

(52) U.S. Cl. ............... 414/412; 414/303; 414/607; 83/175

(58) Field of Classification Search ........... 414/25, 414/607, 24.5, 412; 225/100, 101; 83/18, 83/175; 383/200, 202; 198/303.1
See application file for complete search history.

(56) References Cited

U.S. PATENT DOCUMENTS

| | | | | |
|---|---|---|---|---|
| 3,757,973 A | * | 9/1973 | Lambert et al. | 414/810 |
| 3,820,197 A | * | 6/1974 | JeanMaire | 19/80 A |
| 3,853,235 A | * | 12/1974 | Lambert et al. | 414/412 |
| 4,250,783 A | * | 2/1981 | Ogle | 83/397 |
| 4,344,272 A | | 8/1982 | Gaudette et al. | |
| 4,348,801 A | * | 9/1982 | Dumont et al. | 29/564.3 |
| 4,794,671 A | * | 1/1989 | Goldman | 19/65 R |
| 4,798,508 A | * | 1/1989 | Lewis | 414/412 |
| 4,929,141 A | * | 5/1990 | Keesey et al. | 414/412 |
| 5,072,490 A | * | 12/1991 | Leifeld et al. | 19/80 R |
| 5,090,864 A | * | 2/1992 | Leifeld | 414/412 |
| 5,179,878 A | * | 1/1993 | Kranefeld et al. | 83/13 |
| 5,199,841 A | * | 4/1993 | Von Gehlen | 414/412 |
| 5,203,665 A | * | 4/1993 | Lande | 414/412 |
| 5,282,713 A | * | 2/1994 | Lande | 414/412 |
| 5,318,399 A | * | 6/1994 | Marom | 414/412 |
| 5,328,016 A | * | 7/1994 | Leifeld et al. | 198/345.1 |
| 5,442,895 A | * | 8/1995 | Linson | 53/381.2 |
| 5,443,347 A | * | 8/1995 | Weinlader | 414/412 |
| 5,445,490 A | * | 8/1995 | Whitehead | 414/607 |
| 5,537,809 A | | 7/1996 | Blalock | |
| 6,032,446 A | | 3/2000 | Gola et al. | |
| 6,263,650 B1 | | 7/2001 | Deutsch et al. | |
| 6,591,743 B2 | * | 7/2003 | Deutsch et al. | 100/8 |
| 6,685,120 B2 | | 2/2004 | Grellner | |
| 2001/0000464 A1 | * | 4/2001 | Beale | 414/607 |
| 2002/0048501 A1 | | 4/2002 | Maclay | |

* cited by examiner

*Primary Examiner*—Eileen D. Lillis
*Assistant Examiner*—Charles Greenhut

(57) ABSTRACT

Wrapped cotton bales transported from a cotton harvest area to a receiver at the gin are moved intact to a position generally above a receiver upstream of the ginning equipment. As the bales are supported and conveyed, knife or similar cutting structure severs a portion of the wrap allowing egress of the cotton from the wrap into the receiver. Wrap removal structure prevents the wrap from entering the ginning equipment. In one embodiment of the invention, the wrap is conveyed to a wrap processor after the cotton falls into the receiver. The bale handler can include transversely adjustable cantilever supports to tension wrap for efficient cutting.

10 Claims, 3 Drawing Sheets

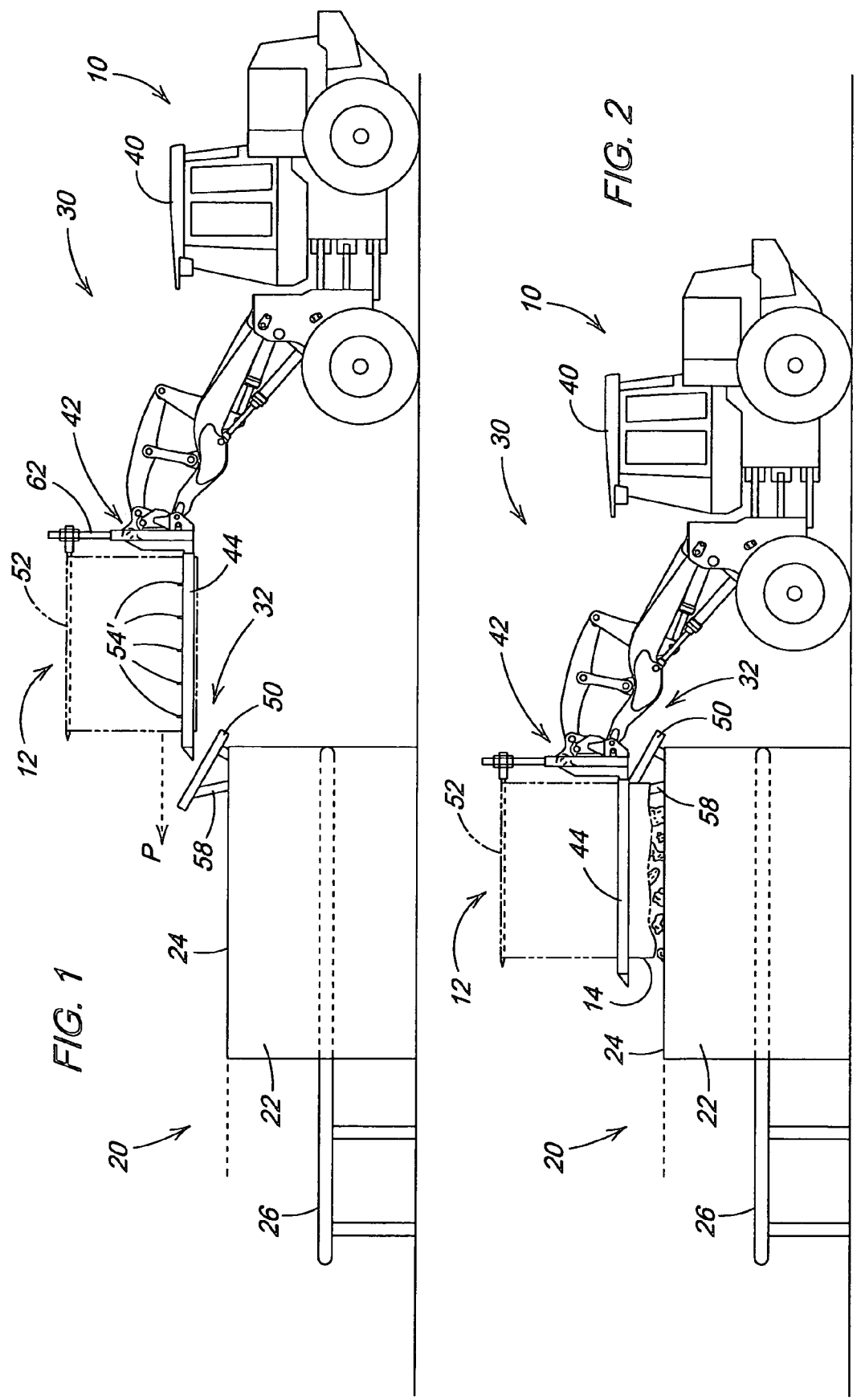

SEED COTTON HANDLING SYSTEM

FIELD OF THE INVENTION

The present invention relates generally to cotton handling systems and, more specifically, to cotton handling systems wherein wrapped cotton bales or modules are transported from a field to a gin for processing.

BACKGROUND OF THE INVENTION

Harvested cotton is typically formed into a bale or module and transported to a gin for processing. Recent developments in in-field processors such as on-board cotton baling or module forming provide substantial potential for improved productivity. However, conventional cotton processing and the infrastructure associated with the conventional processing continues to dominate the cotton industry. Transitioning to handling crop bales or modules formed on a harvester has been a source of difficulty.

Additional difficulties are encountered when a bale or module of harvested material is supported within a wrap such as plastic sheet or netting to protect and maintain integrity of the formed material. When processing seed cotton, the handling system must be able to effectively separate all the cotton material from the wrap before the baled seed cotton enters the cotton gin. Wrapped cotton loses bale shape integrity quickly as the wrap is removed, and therefore substantial difficulties must be overcome to provide a system that advantageously utilizes the wrap to maintain a compact and clean entry configuration while allowing full cotton removal, eliminating spillage, and providing reliable wrap removal.

SUMMARY OF THE INVENTION

It is therefore an object of the present invention to provide an improved cotton handling system. It is a further object to provide such a system which overcomes the aforementioned problems.

It is another object of the present invention to provide a cotton handling system for feeding wrapped bales of cotton to a gin for processing. It is a further object to provide such a system which effectively separates bale wrap material from the cotton in an efficient manner. It is yet another object to provide such a system with an effective conveying and wrap cutting system.

It is another object of the present invention to provide a wrapped bale handling system which is compatible with more conventional handling systems and is economical and easy to use.

Cotton bales formed in the field are wrapped in sheet plastic, netting or other similar material for protection and bale integrity. The wrapped bales are transported from the harvest area to a cotton receiver at the gin and moved intact to a position adjacent a receiver upstream of the ginning equipment. As the bales are conveyed, a knife, rotating blade or other cutting structure severs the wrap allowing the cotton to drop into the receiver. The conveying structure can include adjustable cantilever supports which are spread prior to cutting of the wrap to increase the tension and severability of the wrap and facilitate full removal of the cotton. Wrap engaging structure such as a bale handler spike and retractable support claws prevent the wrap from entering the receiver and ginning equipment. In another embodiment of the invention, air pressure differential is utilized to engage the wrap and convey the wrap to a processor for destruction, packaging or recycling.

The handling system is efficient, economical and easy to use. Compared to traditional cotton handling systems, only a limited amount of additional equipment is required. The wrapped cotton bale or module is maintained in a compact package until the cotton is deposited at the gin and cotton spillage is eliminated or minimized.

These and other objects, features and advantages will become apparent from the description below and the drawings.

BRIEF DESCRIPTION OF THE DRAWINGS

FIG. 1 is a side view of a bale processing system showing a loader positioning a wrapped bale adjacent a receiver having a bale wrap severing device.

FIG. 2 is a view similar to FIG. 1 but showing the bale positioned over the receiver with the wrap severed.

DESCRIPTION OF THE PREFERRED EMBODIMENT

Figure 5:
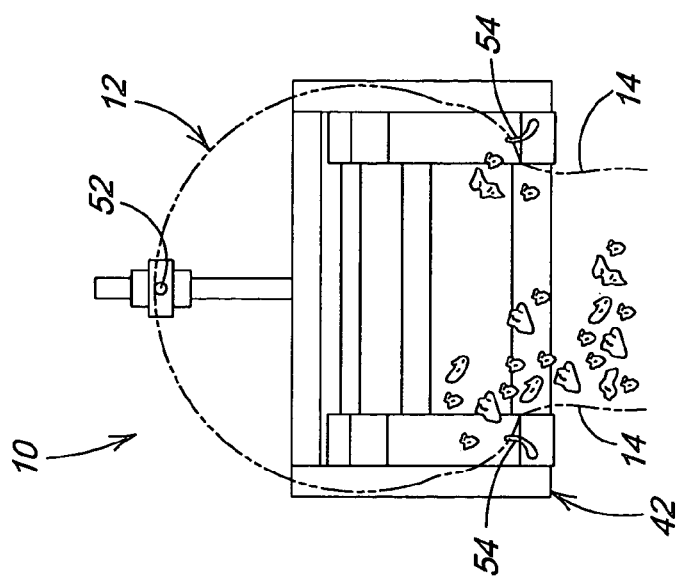
FIG. 5 is a front view of bale support similar to FIG. 4 but with the bale supports in an outermost position and with the bale wrap severed for depositing material into the receiver as shown in FIG. 2.
Figure 4:
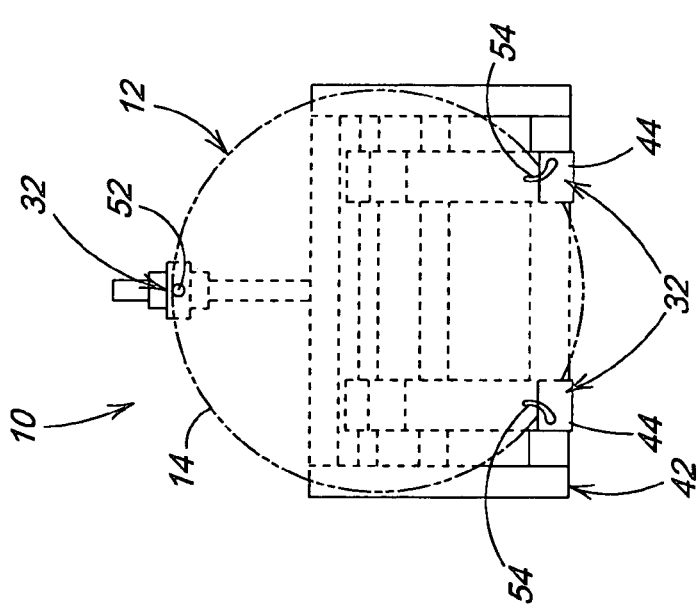
FIG. 4 is a view similar to FIG. 3 showing bale supports on the loader spread prior to movement of the wrapped bale relative to a wrap severing device.
Figure 3:
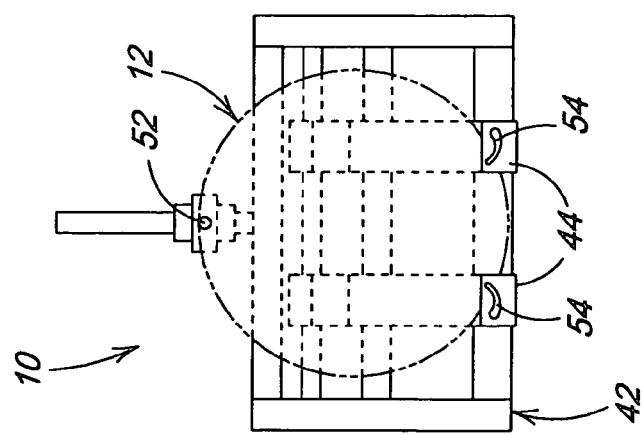
FIG. 3 is a front view of a bale positioned on bale supports on the loader of FIG. 1.

Referring to FIGS. 1–5, a seed cotton handling system indicated generally at 10 is shown and includes a cotton bale or module 12 having a protective wrap 14 forming a compact and relatively dense cotton package. The bale 12 is formed in the field, either by a cotton harvester having an on-board processor for forming harvested cotton in a bale or by a baler or module builder working in conjunction with a harvester. The wrap 14 may be one or a combination of a number of different types, including for example plastic or netting, to provide bale integrity and protection for transport from the field to a processing area 20 such as a cotton gin.

The processing area 20 includes a walled receiver such as shown at 22 having an upwardly opening inlet 24 for receiving seed cotton. A cotton conveyor 26 conveys the cotton material to conventional ginning equipment. A bale positioning or conveying system 30 positions the wrapped bale 12 generally intact at a location adjacent the receiver 22. Wrap removal or engaging structure indicated generally at 32 is located adjacent the receiver 22 to facilitate separation of the cotton in the bale 12 from the wrap 14 and entry of the cotton into the area 20 through the inlet 24 for processing. After the cotton in the bale 12 is separated from the wrap 12, the structure 32 removes the wrap to prevent entry of wrap material into the receiver 22 and ginning equipment.

The bale conveying system as shown in FIGS. 1 and 2 includes a front-end loader 40 having a selectively positionable bale handler 42 with transversely adjustable cantilevered lower forks 44. The bale handler 42 is moved into alignment with round bales 12 on a trailer or carrier (not shown) and the forks 44 are moved outwardly. The loader 40 is then moved forwardly in the axial direction of one of the round bales 12 so the forks extend under portions of the bale 12. The forks 44 are then moved inwardly and the bale handler 42 is raised (FIG. 1) to position the bale 12 adjacent the receiver 20. The raised handler with the intact bale 12 is then moved forwardly along a path P towards the receiver 22.

Different types of wrap removal structure 32 may be used to separate the wrap 12 from the cotton and prevent wrap from entering the ginning equipment. As shown in FIGS. 1 and 2, the wrap removal structure 32 includes a cutter 50 supported adjacent the inlet 24 of the receiver 22 in the path P, and wrap engaging structures 52 and 54 supported by the bale handler 42. The cutter 50 is shown as an inclined knife spring loaded upwardly in a centrally located position by a knife support 58. The support 58 is located along the path P so that the forks 44 straddle the cutter 50 and the knife engages the lowermost portion of the bale 12 centrally between the forks. Therefore as the loader 40 moves forwardly with bale 12 positioned adjacent the inlet 24, the cutter 50 severs the wrap 14 so that the cotton falls between the forks 44 (FIGS. 2 and 5). One or both of the wrap engaging structures 52 and 54 capture the wrap 14 and prevent the wrap from falling into the receiver 22.

The upper wrap engaging structure 52 includes an axially projecting rod or spike adjustably supported from a mast 62 on the handler 42. Upon initial engagement of the bale 12 by the handler 42, the spike 52 enters the bale just below the top extremity of the wrap 14. Upon severing of the wrap 14 by the cutter 50, the wrap 14 drapes over the spike 52 (FIG. 2) as cotton falls into the receiver 22. Thereafter the loader 40 can position the handler 42 over a receptacle or the like and drop the empty wrap for destruction or recycling.

In addition to the spike 52, the lower wrap engaging structure 54 may also be provided adjacent the forks 44. As shown in FIGS. 1 and 3-5, the structure 54 includes a plurality of retractable claws 54' (FIG. 1) spaced along the length of the forks 44 on a rotating rod. Once the forks 44 are positioned along the bale 12 to be transported to the gin, the claws are rotated upwardly from-the position shown in FIG. 3 through the wrap 14 (FIG. 4) on opposite sides of the lowermost portion of the bale 12 where the wrap 14 will be cut by the cutter 50. As the cotton drops from the wrap 14 into the receiver 22, the wrap 14 remains attached to the claws 54' and to the spike 52 for transfer away from the gin area. The claws 54' also help to maintain a wide exit gap (FIG. 5) in the draped wrap for optimum cotton emptying. After the wrap 14 is transferred to a location above the area of wrap deposit, the claws are again retracted to release the wrap from the forks 44.

The lower wrap engaging structure 54, when provided, also may be used to help stretch or tension the wrap 14 in the area of that will be severed by the cutter 50. After the cotton bale 12 is engaged by the forks 44 and the claws 54' of the structure 54 enter the wrap 14, the forks 44 can be spread (FIG. 4) to tighten the wrap in the area to be cut. Such tightening significantly improves the efficiency of the wrap cut. The forks 44 may be spread further (FIG. 5) during or after cutting to assure optimum cotton removal.

Figure 6:
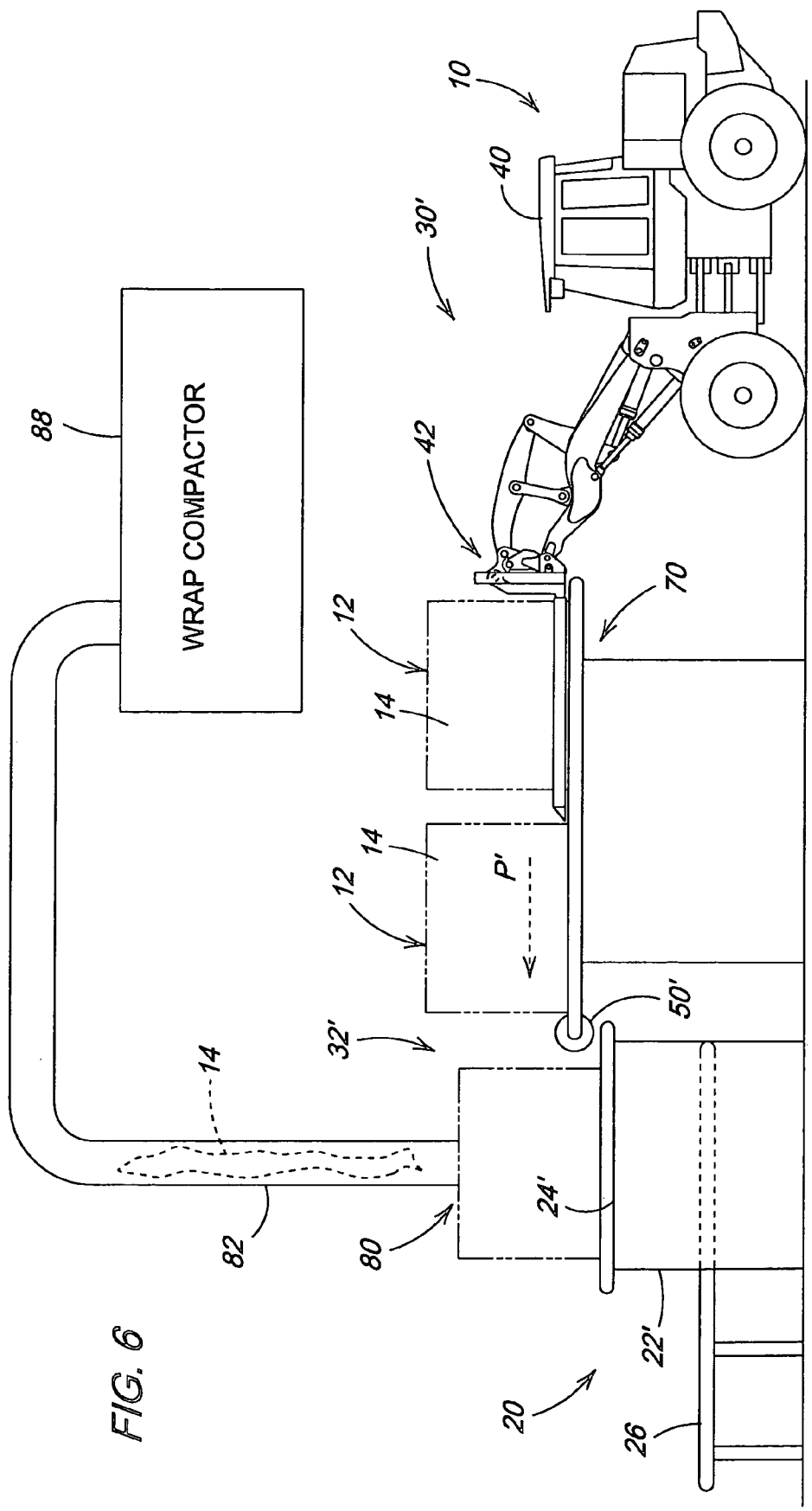
FIG. 6 is a side view of another embodiment of the bale processing system including wrap processing structure.

In an alternate embodiment of the invention shown in FIG. 6, the conveying system 30' includes a vehicle-mounted bale handler 42 which moves the wrapped bales 12 onto a bale input conveyor 70 supported adjacent and slightly above the level of the inlet 24'. The conveyer 70 moves the wrapped bales 12 along a path P' to a location over the inlet 24'. Wrap removal or engaging structure 32' includes a cutter 50', shown as a rotating disk or saw blade, which lies in the path P' and severs the lower portion of the wrap 14 as the portion passes over the upstream extremity of the inlet 24'. Movable suction hood structure indicated at 80 is placed over the bale 12. Differential air pressure causes the wrap 14 to be captured by the hood structure 80 as the cotton exits the severed area of the wrap 14 and falls into the receiver 22'. The hood structure 80 helps maintain efficient egress of cotton from the wrap 14 prevents the wrap from closing on itself as the cotton empties. The hood structure also conveys the empty wrap 14 from the gin area to wrap processing structure 88 such as a wrap compactor or receptacle. The hood structure 80 is repositioned relative to the conveyor 70 to engage the wrap 14 on the next adjacent bale 12.

Having described the preferred embodiment, it will become apparent that various modifications can be made without departing from the scope of the invention as defined in the accompanying claims.

The Invention claimed is:

1. A cotton bale handling method comprising:
   supporting the bale of cotton in a bale configuration using protective wrap extending around the bale;
   transporting a cotton bale with the protective wrap from a harvest location to a cotton gin;
   inserting an upper elongated wrap engaging structure into the bale;
   engaging a lower portion of the protective wrap with a lower wrap engaging structure;
   tensioning a lower portion of the protective wrap with the lower wrap engaging structure;
   positioning the cotton bale adjacent a receiver, the step of positioning including moving the tensioned lower portion of the protective wrap and bale in a conveying direction against a severing device to facilitate removal of the cotton and draping of the protective wrap over the upper elongated wrap engaging structure;
   separating the protective wrap from the cotton while the cotton bale is positioned adjacent the receiver; and
   transferring cotton from the bale away from the wrap into the receiver for processing by the cotton gin.

2. The method as set forth in claim 1 wherein the step of tensioning includes rotating the lower wrap engaging structure.

3. The method as set forth in claim 2 wherein the step of severing includes supporting a knife structure adjacent the receiver, the step of tensioning includes tensioning the wrap adjacent the knife structure, and engaging the tensioned wrap and the knife structure to form a single slit in a direction corresponding to the conveying direction of motion.

4. The method as set forth in claim 2 wherein the step of moving against the device severing, comprises supporting a knife adjacent an end of the receiver and moving the wrapped bale over the knife and towards a position over the receptacle so that the cotton falls from the severed wrap into the receiver.

5. The method as set forth in claim 1 further comprising the step of capturing the protective wrap and preventing the protective wrap from being deposited in the receiver.

6. The method as set forth in claim 5 including positioning the upper wrap engaging portion under the protective wrap a distance approximately equal to a length of the bale prior to the step of severing.

7. The method as set forth in claim 5 wherein the step of capturing comprises capturing the protective wrap using differential air pressure.

8. The method as set forth in claim 5 further comprising transporting the protective wrap away from the receiver through an air duct.

9. The method as set forth in claim 1 including the step of positioning the wrapped bale on a conveyor to move the bale along a path towards the receiver, the step of separating including supporting a wrap removal structure adjacent the conveyor.

10. The method as set forth in claim 9 wherein the step of supporting the wrap removal structure comprises supporting cutting structure at a location in the path to sever the protective wrap as the bale moves adjacent the receiver.

* * * * *